Aug. 12, 1969 W. S. LEE 3,460,328
FRUIT PICKER
Filed Oct. 6, 1965 2 Sheets-Sheet 1

INVENTOR
WILLIAM S. LEE
BY Young & Thompson
ATTORNEYS

Aug. 12, 1969 W. S. LEE 3,460,328
FRUIT PICKER
Filed Oct. 6, 1965 2 Sheets-Sheet 2
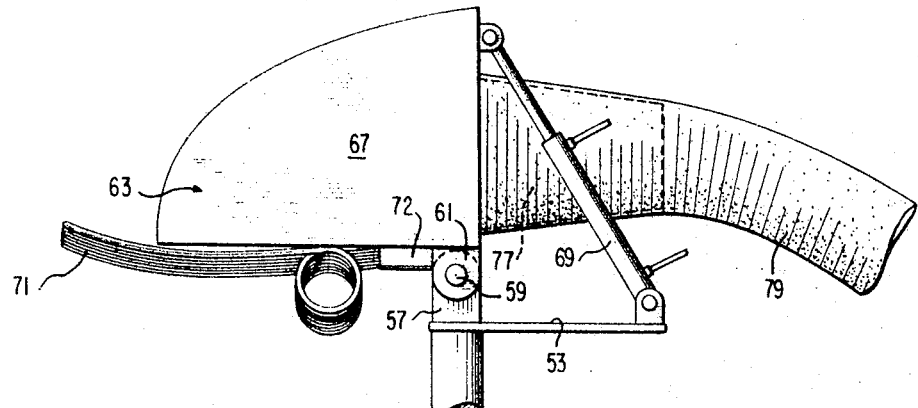
FIG. 2
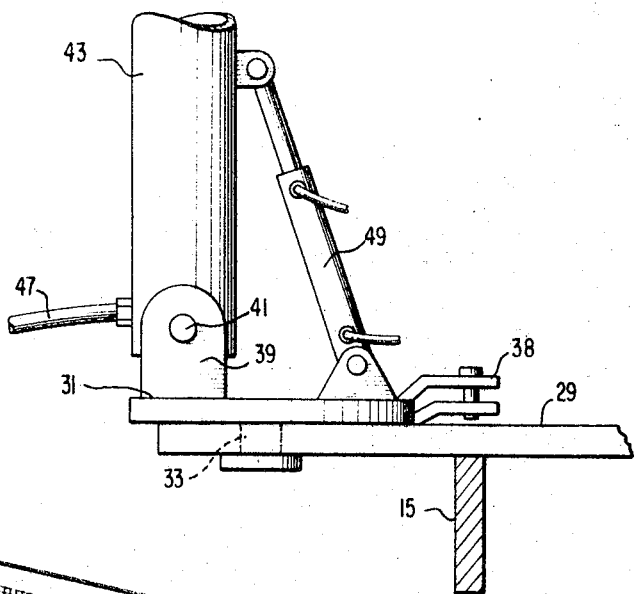
FIG. 3
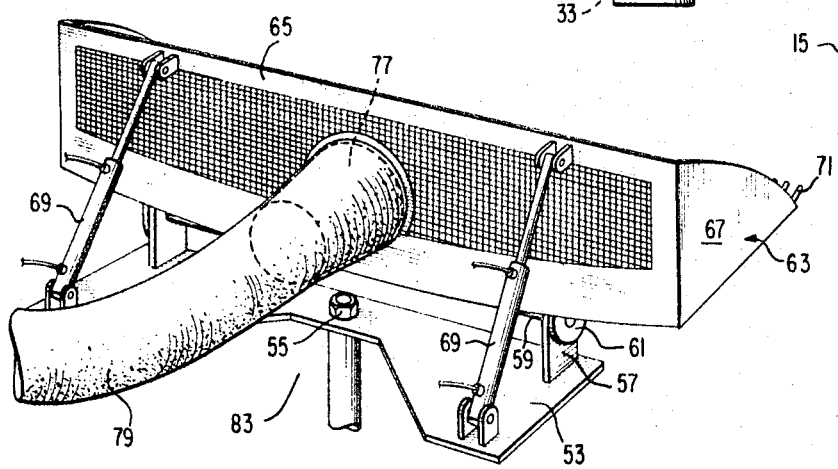
INVENTOR
WILLIAM S. LEE
BY *Young & Thompson*
ATTORNEYS 3,460,328
FRUIT PICKER
William S. Lee, Orlando, Fla., assignor of fifteen percent to Daniel M. Hunter and John T. Pattillo
Filed Oct. 6, 1965, Ser. No. 493,323
Int. Cl. A01g 19/06
U.S. Cl. 56—328        6 Claims

ABSTRACT OF THE DISCLOSURE

A fruit picker has a telescopic standard on which a vertically swinging picker head is mounted. The picker head has a bottom wall comprised of a plurality of resilient fingers that are specially mounted and oriented. A special support adapts the picker for mounting on a tractor.

---

The present invention relates to fruit pickers, particularly of the type supported by standards, and more particularly of the power-driven type.

Heretofore, the picking of fruit from trees, such as oranges and grapefruit, has been a laborious and time-consuming operation. It has been necessary for workers to erect ladders adjacent the tree and to pick the fruit by hand. The picked fruit was then carried in sacks or delivered along chutes to points of reception, and then loaded into trucks or trailer bodies.

Thus, the rising costs of labor, and the increasing shortage of workers, particularly at the seasons of peak requirement when the crop is ripe, have made the harvesting of fruit such as citrus fruit an expensive and financially hazardous undertaking.

Accordingly, it is an object of the present invention to provide a fruit picker which picks fruit many times faster than pickers who pick by hand.

Another object of the present invention is the provision of fruit pickers of the power-driven type which are adapted to avoid becoming blocked by variously positioned limbs of the tree.

Still another object of the present invention is the provision of fruit pickers having picker members adapted to move in any desired direction.

It is also an object of the present invention to provide fruit pickers adapted to pick fruit of different sizes.

Still another object of the present invention is the provision of fruit pickers which will not pick undersized fruit.

It is also an object of the present invention to provide a fruit picker which will not damage either the fruit or the tree.

Finally, it is an object of the present invention to provide a fruit picker which will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIGURE 2 is an enlarged side elevational view, with parts broken away, showing the fruit picker of the present invention; and FIGURE 3 is an enlarged rear perspective view of the picker head of the present invention.

Figure 1:
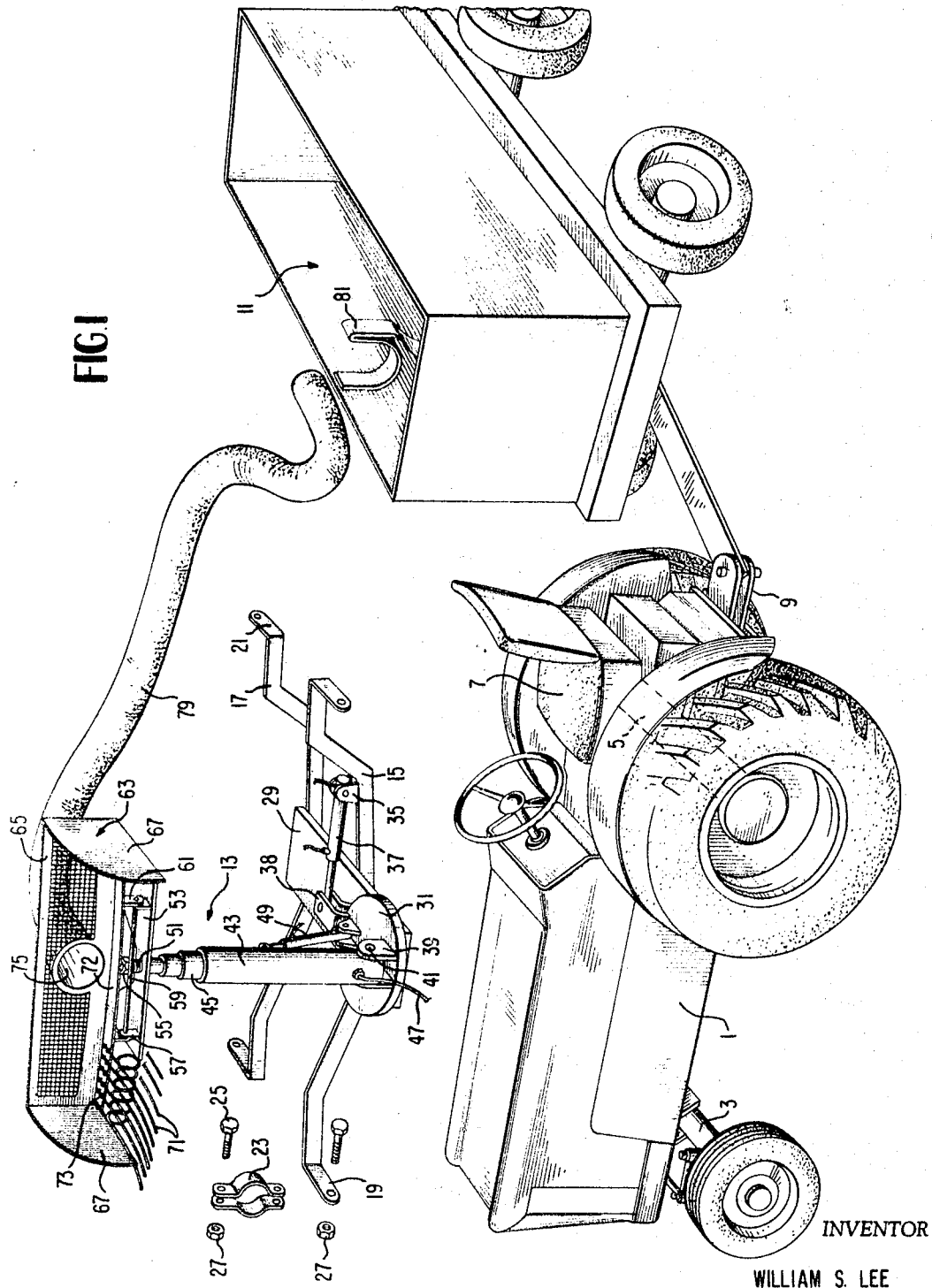
FIGURE 1 is an exploded assembly view of a fruit picker according to the present invention.

Referring now to the drawings in greater detail, there is shown a fruit picker comprising a tractor 1 of conventional construction having a front wheel axle 3 and a rear wheel axle 5, a driver's seat 7, and a rear trailer hitch 9. A trailer 11 is drawn behind the tractor by the usual drawbar.

The fruit picker itself is generally shown at 13. Picker 13 comprises a pair of frame members 15 and 17 which extend generally parallel to each other lengthwise of the tractor. Frame members 15 and 17 are provided at their forward ends with outwardly extending flanges 19 and at their rear ends with outwardly extending flanges 21. Two sets of clamping collars 23, of which only one set is shown, encompass front wheel axle 3 and are secured together and to the flanges 19 of frame members 15 and 17 by means of bolts 25 and nuts 27. The rear flanges 21 of frame members 15 and 17 are similarly secured to rear wheel axle 5 by clamping means (not shown). An underframe for picker 13 is thus provided which is rigidly secured to the tractor axles to provide a steady support for fruit picker 13.

Fixedly secured to both frame members 15 and 17 is a horizontal platform 29. A flat circular horizontal plate 31 is mounted for rotation on and relative to platform 29 about a vertical axis by means of a pivot 33 that depends downwardly from plate 31 through platform 29. Frame member 15 carries a pair of ears 35 between which is pivotally mounted, with ample play, one end of a fluid motor 37 of the cylinder-and-piston type which is supplied from a source of hydraulic pressure (not shown) so that motor 37 is double acting. At its forward end, fluid motor 37 is pivotally interconnected with ears 38 fixed to and extending outwardly from plate 31. Operation of fluid motor 37 thus rotates plate 31 horizontally in either direction about pivot 33.

At its side opposite ears 38, plate 31 carries a pair of upstanding ears 39 between which is carried the pivot 41 of the lower end of a telescopic cylinder 43. Telescopic cylinder 43 has a plurality of sections 45 slidably telescopically disposed one within the other, and cylinder 43 and its associated sections 45 comprise an upright or standard on which the picker proper is mounted. The axis of cylinder 43 is offset a substantial horizontal distance from the axis of pivot 33.

Cylinder 43 is not double acting, but instead is supplied from a source of hydraulic pressure (not shown) by a single conduit 47. Suitable valve means (not shown) connect conduit 47 alternately with that source of hydraulic pressure and with a sump. When connected with the source of fluid pressure, the telescopic assembly 43, 45 is extended or maintained extended; and when connected with the sump, hydraulic fluid drains through conduit 47 under the weight of the sections 45 and the picker unit they support so that the telescopic assembly 43, 45 is retractable by gravity. Alternatively, of course, the assembly 43, 45 can be made double acting.

A fluid motor 49 is pivotally connected at one end to a portion of plate 31 remote from pivot 41, and at its other end is pivotally connected to a portion of cylinder 43 remote from pivot 41. The axes about which fluid motor 49 is thus pivotally connected are both parallel to pivot 41. Motor 49 is actuated by a source of hydraulic pressure (not shown) and is double acting so that the telescopic assembly 43, 45 can be moved to any desired inclination within a range of upright inclinations on either side of and including the vertical.

At its upper end, the innermost telescopic section 45 carries an upwardly extending screw-threaded stud 51. A picker head platform 53, disposed in a plane perpendicular to the axis of the telescopic assembly 43, 45, is provided with an opening through which stud 51 extends. A nut 55 is screw-threadedly engageable with stud 51 to secure platform 53 in assembled relationship.

Adjacent its forward edge, platform 53 carries upstanding ears 57 which are spaced apart a major portion of the length of platform 53. A shaft 59 is carried between ears 57, and ears 61 that downwardly depend from a picker head 63 are pivotally interconnected with ears 57 by means of shaft 59.

Picker head 63 is generally scoop shaped and comprises a generally upright rear wall 65 and forwardly extending side walls 67. A pair of fluid motors 69 are provided, one disposed toward either end of rear wall 65, and each pivotally interconnected between rearwardly extending portions of platform 53 and upper portions of rear wall 65. Fluid motors 69 are double acting and are actuated by a source of hydraulic fluid under pressure (not shown) and are pivotally interconnected with platform 53 and rear wall 65 about axes parallel to shaft 59, so that the operation of fluid motors 69 will swing picker head 63 vertically relative to platform 53 and the telescopic standard and the rest of the support, any desired amount about a horizontal axis coincident with the axis of shaft 59.

The bottom wall of picker head 63 is comprised of a plurality of picker fingers 71 disposed in generally parallel relationship to each other and extending forwardly from adjacent rear wall 65 and terminating in free ends. Picker fingers 71 are preferably resilient and of a material such as steel, and may if desired be coated with a plastic or an elastomer such as rubber or polyvinylchloride or other relatively soft and weather-resistant material so as to minimize damage to the fruit. As shown, picker fingers 71 are generally upwardly concave, their free ends being disposed at a small acute angle to rear wall 65, so that when rear wall 65 is vertical, the free ends of picker fingers 71 will be upwardly forwardly inclined. Picker fingers 71 are detachably secured to a forwardly extending marginal flange 72 of rear wall 65, by means of detachable mounting means 73. Flange 72 in turn is upwardly concave, so that not only is each picker finger 71 upwardly concave, but also the series of picker fingers from end to end of picker head 63 is upwardly concave when viewed in a direction perpendicular to rear wall 65.

Rear wall 65 is also provided with a central opening 75 of a size sufficient to permit the passage of a plurality of citrus fruit without clogging or jamming. Behind opening 75 is a rearwardly extending adapter 77 rigid with rear wall 65. A flexible chute 79 is detachably secured to the rear end of adapter 77 to conduct citrus fruit by gravity to trailer 11 for storage therein. A bracket 81 carried by a side wall of the body of trailer 11 detachably retains chute 79 to ensure that the free lower end of the chute will remain in the trailer. Also, platform 53 is provided with a rearwardly opening recess 83 at its rear portion, to prevent interference between the rear edge of platform 53 and the flexible chute 79.

It will be appreciated that the various fluid motors which have been described above are operable by conventional hydraulic circuits (not shown) including a hydraulic pump which can be driven by a power takeoff of the tractor, with appropriate valves for the selective and individual operation of the various fluid motors from a control panel accessible to the driver, so that the driver can at will individually operate any of fluid motors 37, 49 and 69 in either direction, and can send hydraulic fluid under pressure to cylinder 43 or drain it from cylinder 43, as desired.

In operation, therefore, the driver of the tractor positions the tractor so that it is adjacent a tree to be picked, with the picker fingers below the height of the lowest limbs bearing fruit and the fingers extending into or beneath the foliage a distance of perhaps three feet. In this connection, it should be noted that about 90% of the fruit of a citrus tree is in the outermost three feet of the foliage. The ends of the fingers 71 in this position preferably extend upwardly at about 10° from the horizontal. The cylinder 43, if desired, may be vertical.

The driver then sends hydraulic fluid under pressure through conduit 47 to extend the sections 45 within cylinder 43. The picker fingers 71 thus move up through the foliage. As two adjacent fingers contact a fruit, the fruit is drawn upwardly until its stem is lowermost. Upon further rising of the picker fingers, the fruit is plucked with the same motion that is used by a manual picker, that is, the fruit is turned upwardly, stem down. There is no damage to the fruit or to the tree.

The fruit that collects on the shelf provided by the picker fingers passes through the opening 75 and the adapter 77 and thence through the chute 79 by gravity into the upwardly open body of the trailer 11. The picker head may be swung clockwise as seen in FIG. 2 to facilitate this transfer.

It is of course understood that the limbs of the tree pass between the picker fingers. Should the fingers encounter a crosswise limb, however, then fluid motor 37 can be actuated in an appropriate direction to turn the picker 13 about the vertical axis of pivot 33 so that the picker fingers are generally parallel to the crosswise limb. The vertical movement of the picker head can then be resumed until the crosswise limb has been passed, whereupon motor 37 can be actuated in the reverse direction to return the fingers to their generally forwardly extending position, that is, to a position in which they generally point to the trunk of the tree. The offsetting of pivot 41 horizontally from pivot 33 increases this range of adjustive movement that can be effected by operation of motor 37.

When one upward traverse of the fingers through the foliage has been completed, the tractor can be backed away from the tree, the telescopic standard lowered so that the fingers are again at their minimum height, and the tractor maneuvered to position the picker for a further upward sweep through the tree. In this fashion, a tree can be picked in about 5–7 minutes, as compared to about 50–70 minutes heretofore required for a manual picker to accomplish the picking of an entire tree.

As the picker fingers are removable from the picker head, they can be replaced when worn or damaged. Also of great importance is the fact that the picker fingers can be selectively removed according to the size of the fruit it is desired to pick. For example, alternate picker fingers can be removed so as to convert the picker from an orange picker to a grapefruit picker.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A fruit picker of the type adapted to be mounted on a power-driven vehicle having front and rear axles, comprising a pair of frame members which extend generally parallel to each other lengthwise of the vehicle, clamping collars at the ends of the frame members for releasably securing the frame members to both axles of the vehicle, a horizontal platform that is secured to both said frame member and that has a portion extending laterally a substantial distance to the outer side of one of the frame members, a turntable carried by said laterally extending platform portion for horizontal swinging movement about a vertical axis, a general upright standard mounted on said turntable, picker fingers extending outwardly from the upper end of the standard, and means for moving the picker fingers upwardly and downwardly relative to the turntable whereby the fingers pick fruit from the trees upon upward movement relative of the fingers to the turntable.

2. A fruit picker as claimed in claim 1, and a double-acting hydraulic motor pivotally secured at one of its ends to one of said frame members and pivotally secured at its other end to said turntable a substantial distance from said vertical axis for rotating said turntable about said vertical axis.

3. A fruit picker comprising a support, a standard mounted on the support, a picker head carried by the upper portion of the standard, the picker head having an upright foraminous rear wall and forwardly extending side walls, a plurality of resilient picker fingers disposed in generally parallel relationship to each other and extending forwardly from adjacent the lower edge of said foraminous rear wall and terminating in free ends and comprising the bottom wall of the picker head, said picker fingers being generally upwardly concave and having their free ends disposed at an acute angle to said foraminous rear wall, said foraminous rear wall having a central opening through a lower portion thereof, a flexible chute extending rearwardly from said central opening to convey picked fruit, and means for moving said picker head up and down relative to the support whereby said fingers pick fruit from trees upon upward movement relative to the support.

4. A fruit picker comprising a support, a telescopic standard mounted on the support and comprising a telescopic cylinder having a plurality of sections slidably telescopically disposed one within the other, hydraulic pressure means for upwardly extending and downwardly retracting the telescopic standard, a picker head, a picker head platform fixedly secured to the upper end of said upper portion of the standard and perpendicular to the axis of the standard, means pivotally interconnecting the picker head and the picker head platform for vertical swinging movement of the picker head on and relative to the platform about a horizontal axis, said pivotal interconnecting means comprising a pair of coaxial pivots spaced apart a substantial distance on opposite sides of the axis of the standard, picker fingers extending outwardly from and comprising the bottom wall of said picker head, and a double-acting hydraulic motor pivotally interconnected at its opposite ends with the picker head platform and the picker head substantial distances from the common axis of said pivots.

5. A fruit picker comprising a support, a telescopic standard mounted on the support and comprising a telescopic cylinder having a plurality of sections slidably telescopically disposed one within the other, hydraulic pressure means for upwardly extending and downwardly retracting the telescopic standard, a picker head, a picker head platform fixedly secured to the upper end of said upper portion of the standard and perpendicular to the axis of the standard, means pivotally interconnecting the picker head and the picker head platform for vertical swinging movement of the picker head on and relative to the platform about a horizontal axis, said pivotal interconnecting means comprising a pair of coaxial pivots spaced apart a substantial distance on opposite sides of the axis of the standard, picker fingers extending outwardly from and comprising the bottom wall of said picker head, said upper end of said upper portion of the telescopic standard being comprised by an upwardly extending screw-threaded stud that extends through said picker head platform, and a screw-threaded fastener screw-threadedly engageable with said stud to secure said platform in assembled relationship on said standard.

6. A fruit picker comprising a support, a telescopic standard mounted on the support and comprising a telescopic cylinder having a plurality of sections slidably telescopically disposed one within the other, hydraulic pressure means for upwardly extending and downwardly retracting the telescopic standard, a picker head, a picker head platform fixedly secured to the upper end of said upper portion of the standard and perpendicular to the axis of the standard, means pivotally interconnecting the picker head and the picker head platform for vertical swinging movement of the picker head on and relative to the platform about a horizontal axis, said pivotal interconnecting means comprising a pair of coaxial pivots spaced apart a substantial distance on opposite sides of the axis of the standard, picker fingers extending outwarly from and comprising the bottom wall of said picker head, a double-acting hydraulic motor pivotally interconnected at its opposite ends with the picker head platform and the picker head substantial distances from the common axis of said pivots, said upper end of said upper portion of the telescopic standard being comprised by an upwardly extending screw-threaded stud that extends through said picker head platform, and a screw-threaded fastener screw-threadedly engageable with said stud to secure said platform in fixed position on top of said standard.

References Cited
UNITED STATES PATENTS

| | | | |
|---|---|---|---|
| 1,793,464 | 2/1931 | Chandler | 56—330 |
| 2,690,639 | 10/1954 | Goodwin | 56—328 |
| 2,940,623 | 6/1960 | Shook | 214—778 X |
| 3,077,720 | 2/1963 | Grove et al. | 56—328 |
| 3,329,291 | 7/1967 | Przybylski | 214—141 |

ANTONIO F. GUIDA, Primary Examiner

PASQUALE A. RAZZANO, Assistant Examiner